United States Patent
Chuang (10) Patent No.: US 6,883,814 B2
(45) Date of Patent: Apr. 26, 2005

(54) CAMBERING VEHICLE

(75) Inventor: Jin Chen Chuang, Taichung (TW)

(73) Assignee: Unique Forces Limited, Tortola (VG)

( * ) Notice: Subject to any disclaimer, the term of this patent is extended or adjusted under 35 U.S.C. 154(b) by 0 days.

(21) Appl. No.: 10/638,449

(22) Filed: Aug. 11, 2003

(65) Prior Publication Data

US 2004/0256823 A1 Dec. 23, 2004

Related U.S. Application Data

(63) Continuation-in-part of application No. 10/608,399, filed on Jun. 23, 2003, and a continuation-in-part of application No. 10/608,398, filed on Jun. 23, 2003.

(51) Int. Cl.[7] .............................................. B62M 1/00
(52) U.S. Cl. .............................. 280/87.041; 280/87.05; 280/62
(58) Field of Search ......................... 280/87.01, 87.021, 280/87.041, 87.042, 87.05, 38, 62, 287

(56) References Cited

U.S. PATENT DOCUMENTS

| | | | |
|---|---|---|---|
| 1,303,327 A | | 5/1919 | Wickman |
| 1,336,100 A | | 4/1920 | Shearer |
| 1,617,357 A | * | 2/1927 | Walter ........................ 280/221 |
| 1,664,858 A | | 4/1928 | Headley |
| 2,613,083 A | * | 10/1952 | Moludy ....................... 280/42 |
| 4,045,048 A | | 8/1977 | Irwin |
| 4,047,732 A | | 9/1977 | Williams et al. |
| 4,050,711 A | | 9/1977 | Denzer |
| 4,050,712 A | | 9/1977 | Denzer et al. |
| 4,050,713 A | | 9/1977 | Williams |
| 4,054,300 A | | 10/1977 | Winchell |
| 4,065,146 A | | 12/1977 | Denzer |
| 4,071,261 A | | 1/1978 | Winchell |
| 4,076,270 A | | 2/1978 | Winchell |
| 4,087,104 A | | 5/1978 | Winchell et al. |
| 4,087,107 A | | 5/1978 | Winchell |
| 4,087,108 A | | 5/1978 | Winchell |
| 4,088,338 A | | 5/1978 | Winchell et al. |
| 4,123,079 A | | 10/1978 | Biskup |
| 4,133,551 A | | 1/1979 | Biskup |
| 4,165,093 A | | 8/1979 | Biskup |
| 4,325,565 A | | 4/1982 | Winchell |
| 4,526,390 A | | 7/1985 | Skolnik et al. |
| 4,540,192 A | | 9/1985 | Shelton |
| RE32,031 E | | 11/1985 | Winchell |

(Continued)

FOREIGN PATENT DOCUMENTS

| | | |
|---|---|---|
| CA | 2390224 A1 | 5/2001 |
| WO | WO/92/00217 A1 * | 1/1992 |
| WO | WO 01/32470 A3 | 5/2001 |
| WO | WO 01832470 A2 | 6/2001 |

OTHER PUBLICATIONS

Don Sherman, *Camber Jamboree,* Car and Driver Magazine, Jan. 1961, pp. 53–61, USA.

Primary Examiner—Christopher P. Ellis
Assistant Examiner—Jeff Restifo
(74) Attorney, Agent, or Firm—Lerner, David, Littenberg, Krumholz & Mentlik, LLP (57) ABSTRACT

A cambering vehicle includes a front column, left and a right trailing arms each having a front portion pivotally attached to either the front column or a bracket attached thereto by a pivot axle which is preferably inclined relative to the bracket or the front column. A detachable latching device may be used to detachably latch the bracket, if so provided, and thus the trailing arms to the front column at the working position. The bracket and thus the trailing arm may be rotated relative to the front column to the folding position when the detachably latching device releases the bracket relative to the front column. The cambering vehicle may also include a link connect the trailing arms independent of the front column, and a braking mechanism to inhibit forward movement of the cambering vehicle.

6 Claims, 13 Drawing Sheets

U.S. PATENT DOCUMENTS

| | | | |
|---|---|---|---|
| 4,776,604 A | | 10/1988 | Valdez et al. |
| 5,039,121 A | | 8/1991 | Holter |
| 5,547,204 A | | 8/1996 | Gamzo |
| 5,785,331 A | | 7/1998 | Rappaport |
| 6,220,612 B1 | | 4/2001 | Beleski, Jr. |
| 6,286,845 B1 | * | 9/2001 | Lin .......................... 280/87.05 |
| 6,318,741 B1 | | 11/2001 | Chen |
| 6,343,798 B1 | * | 2/2002 | Chen et al. ................ 280/5.26 |
| 6,367,829 B1 | * | 4/2002 | Lee .......................... 280/87.05 |
| 6,378,879 B2 | * | 4/2002 | Rappaport ............. 280/87.041 |
| 6,428,021 B1 | * | 8/2002 | Tung ..................... 280/87.041 |
| 6,450,517 B1 | * | 9/2002 | Lee ....................... 280/87.041 |
| 6,467,781 B1 | | 10/2002 | Feng |
| 6,485,039 B1 | * | 11/2002 | Ming-Fu ................ 280/87.041 |
| 6,499,751 B1 | | 12/2002 | Beleski, Jr. |
| 6,517,093 B2 | * | 2/2003 | Feng ..................... 280/87.042 |
| 6,554,302 B1 | | 4/2003 | Liu |
| 6,719,310 B1 | * | 4/2004 | Lin ....................... 280/87.041 |
| 6,827,358 B2 | * | 12/2004 | Beleski, Jr. ............ 280/87.041 |
| 2001/0003392 A1 | | 6/2001 | Rappaport |
| 2002/0050695 A1 | | 5/2002 | Feng |
| 2002/0053775 A1 | * | 5/2002 | Feng ..................... 280/87.041 |
| 2002/0063406 A1 | | 5/2002 | Feng |
| 2002/0063411 A1 | | 5/2002 | Feng |
| 2002/0064417 A1 | | 5/2002 | Feng |
| 2002/0070519 A1 | | 6/2002 | Rappaport |
| 2003/0006569 A1 | | 1/2003 | Combs |
| 2003/0090078 A1 | | 5/2003 | Beleski, Jr. |
| 2004/0032105 A1 | * | 2/2004 | Tsai ...................... 280/87.041 |
| 2004/0178597 A1 | * | 9/2004 | Tang ..................... 280/87.041 |

* cited by examiner

CAMBERING VEHICLE

CROSS-REFERENCE TO RELATED APPLICATIONS

The present continuation-in-part application relates to U.S. application Ser. No. 10/608,399, filed Jun. 23, 2003 and U.S. application Ser. No. 10/608,398, filed Jun. 23, 2003, the disclosures of which are hereby incorporated herein by reference.

BACKGROUND OF THE INVENTION

The present invention relates to a cambering vehicle of the type having a single front wheel extending from a vertical steering stem's lower extremity and two rear wheels, each attached to one of a pair of horizontal trailing arms pivotally attached to the steering stem. Typically, handlebars attach to the steering stem's upper extremity to permit manipulation of the single wheel. Above the rear wheels on each of the trailing arms are platforms for the user to stand on while operating the vehicle. More particularly, the cambering vehicle of the present invention also includes a novel structure which may be readily folded for storage or transport, for example. Another embodiment of the cambering vehicle of the present invention includes a novel crossbar member spanning the two trailing arms.

Various conventional cambering vehicles have been developed. Such conventional vehicles are generally operator propelled three wheeled vehicles comprising a front column having a steering shaft rotatably attached thereto, a front wheel attached to the bottom of the steering shaft, and a pair of laterally spaced rear wheels on trailing arms which are articulated to the front column. More complex vehicles also include additional elements, including brakes.

To move the vehicle, the operator stands upon platforms provided on each trailing arm. By alternately leaning left and right, the vehicle will camber left and right. This cambering induces a force between the rear wheels and a surface upon which the vehicle is placed. The force produces work driving the vehicle forward along a sinusoidal path, the frequency of which is related to the user's input of alternate leans and the amplitude of which is related to the speed of the vehicle.

More recent of the conventional cambering vehicles are designed to be folded into a compact configuration for storage or transport, for example. Several of the prior art cambering vehicles fold at the connection of the steering stem and the trailing arms. Other vehicles have trailing arms with intermediate folding mechanisms. Such vehicles often suffer from the application of unwanted flexing within the trailing arm. Also, such folding mechanisms typically include quick-release type features, which may cause folding of the device at inadvertent times, or which may be difficult to operate.

The trailing arms of conventional vehicles have their front ends rotatably or pivotally secured to the front column by utilizing an attachment fitting or shaft that is perpendicular to the front column. When the vehicle is cambered toward one side, such as the right side, the left trailing arm and thus the left rear wheel may be forced or caused to be moved upwardly away from the ground, or may not be suitably contacted with the ground.

Conversely, when the vehicle is cambered toward the other side, for example the left side, the right trailing arm and thus the right rear wheel may also be forced or caused to be moved upwardly away from the ground, or may not be suitably contacted with the ground, such that the vehicle may not be stable as it travels along the sinusoidal path.

Aspects of the present invention mitigate and/or obviate the aforementioned disadvantages of the conventional cambering vehicles.

SUMMARY OF THE INVENTION

In accordance with one embodiment of the invention, there is disclosed a cambering vehicle comprising an elongate front column having a longitudinal axis; a bracket assembly attached to the front column by a pivot shaft; a first pivot axle and a second pivot axle adjacent the bracket; a first trailing arm pivotally attached to the first pivot axle; a second trailing arm pivotally attached to the second pivot axle; and first and second rear wheels associated with the first and second trailing arms; wherein the steering column may be rotated away from the bracket about the pivot shaft and toward the first and second trailing arms to place the cambering vehicle in a folded position. The steering column may be rotated about the pivot shaft toward the bracket to place the cambering vehicle in a working position. The cambering vehicle may also include a latching mechanism attached to the bracket to secure the bracket to the column in the working position. The latching mechanism may comprise a spring-loaded latch. The bracket may further comprise an aperture therethrough, where the latching mechanism further comprises a spring-loaded shaft capable of fitting within the aperture to releaseably connect the bracket to the steering column. Finally, the first and second pivot axles may be inclined from an imaginary line perpendicular to the longitudinal axis of the front column.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION

Referring to the drawings, and initially to FIGS. 1–6, a cambering vehicle 1 in accordance with the first embodiment of the present invention comprises a front column 2 including a front tube 20, a steering shaft 30, a portion of which is rotatably engaged or disposed concentrically within the front tube 20, a front fork 31 attached to a bottom end of the steering shaft 30 to support a front wheel 32, and a handle 34 supported on a top end of the steering shaft 30.

Figure 1:
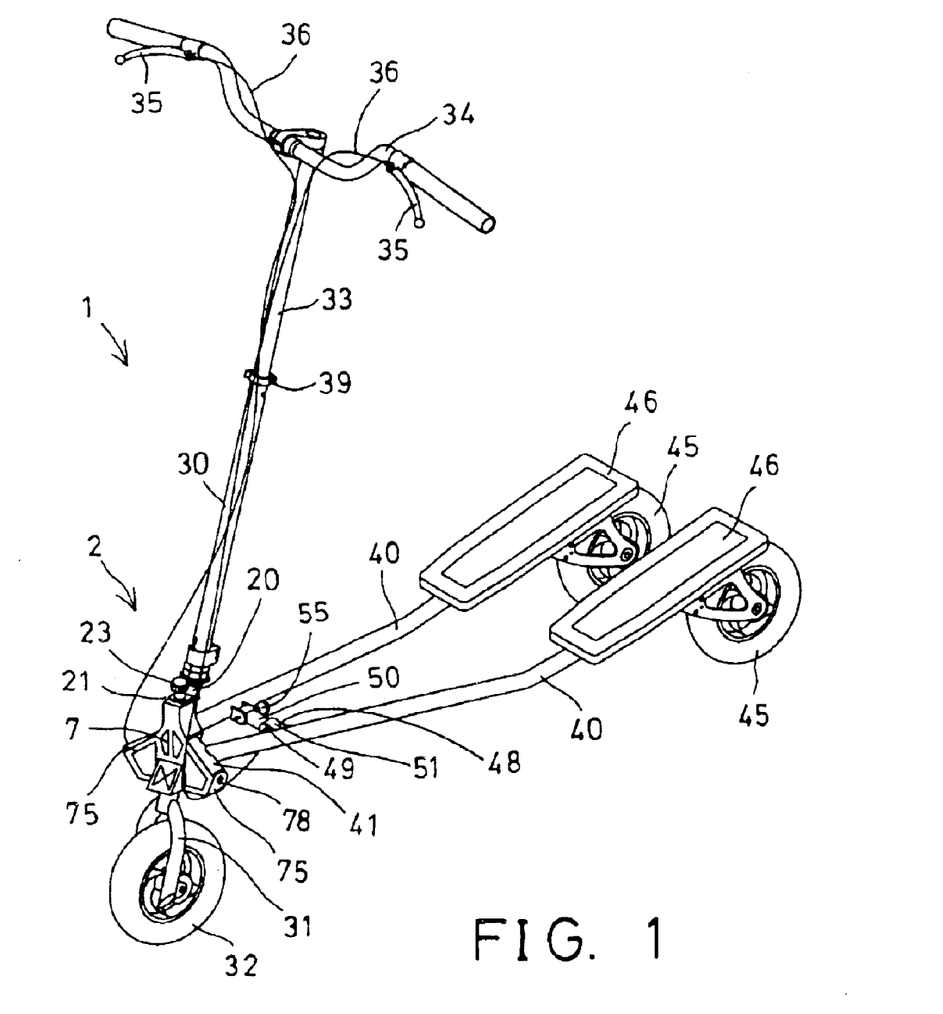
FIG. 1 is a perspective view of a cambering vehicle constructed in accordance with one embodiment of the present invention.
Figure 2:
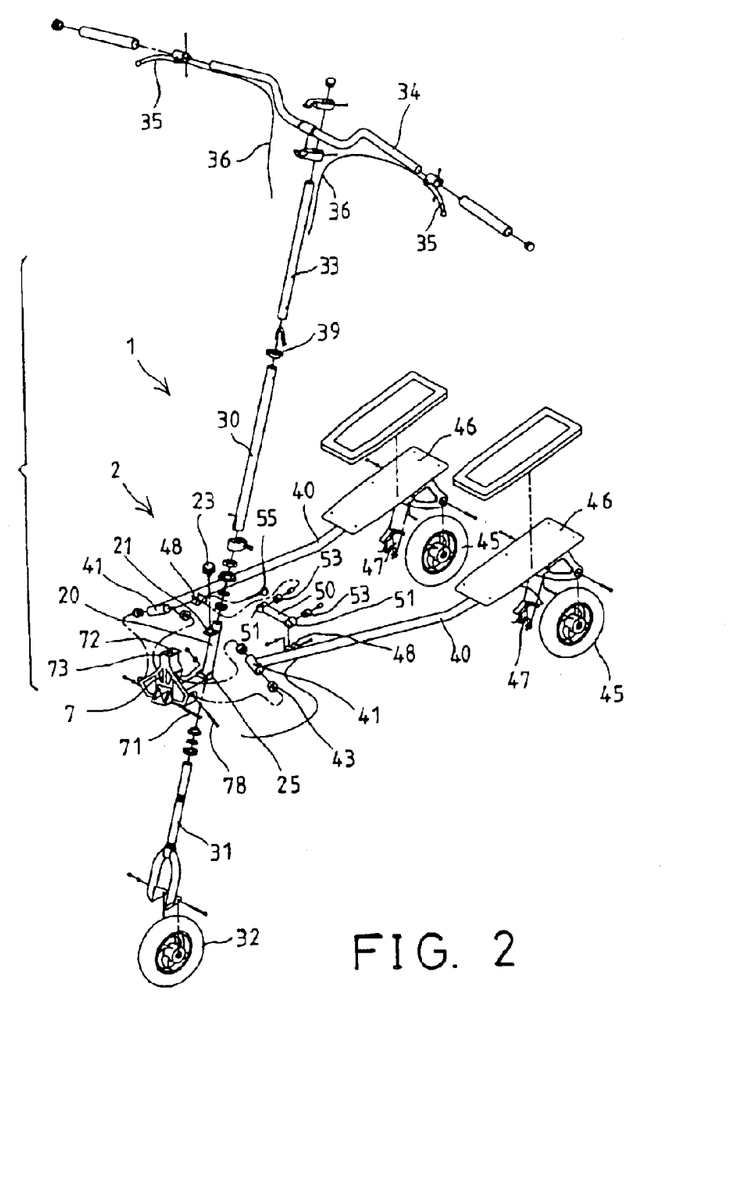
FIG. 2 is an exploded view of the cambering vehicle of FIG. 1.

The steering shaft 30 may preferably be provided with a stem 33 retractably received therein and extendible outwardly therefrom, or adjustably secured to the steering shaft 30 with a device such as a quick release clamp 39. The handle 34 is secured on top of the steering shaft 30 or on top of the stem 33 of the steering shaft 30, if so provided. One or more, and preferably two, brake hand grips 35 are attached to the handle 34 for braking purposes, and are coupled to cables 36 respectively.

Figure 3:
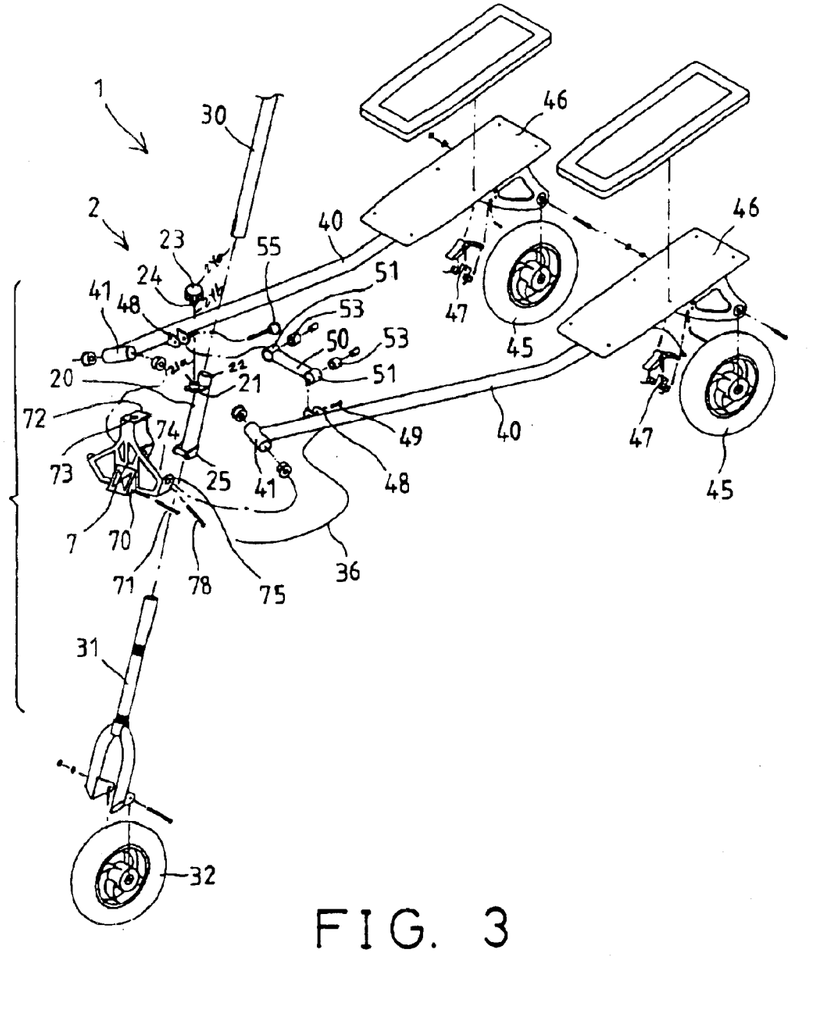
FIG. 3 is an enlarged partial exploded view of the cambering vehicle of FIG. 1.
Figure 4:
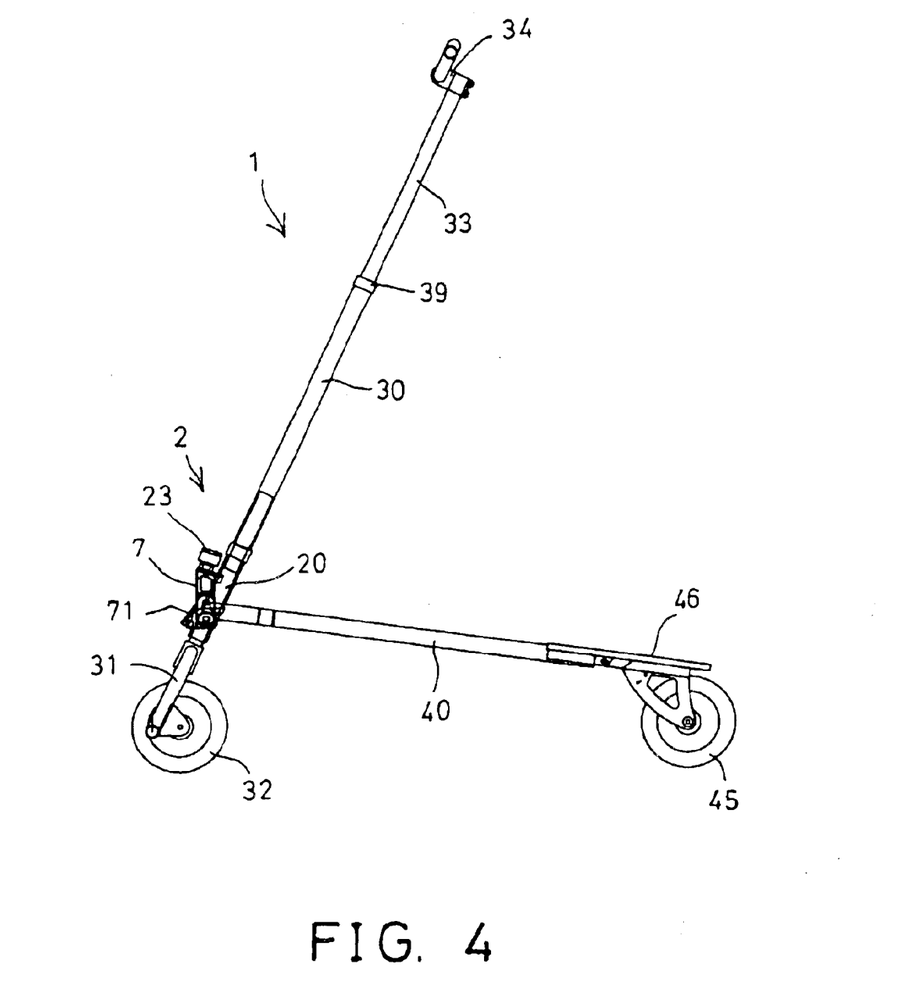
FIG. 4 is a side view of the cambering vehicle of FIG. 1.
Figure 5:
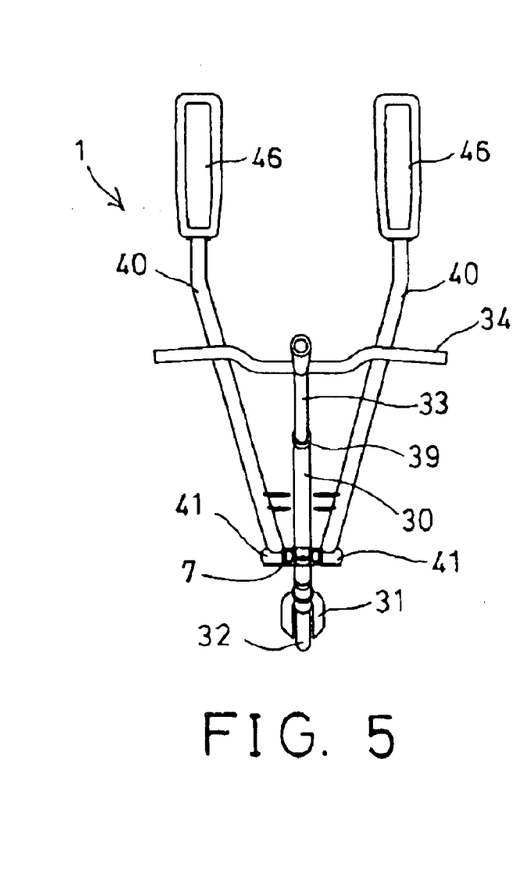
FIG. 5 is a top view of the cambering vehicle of FIG. 1.
Figure 6:
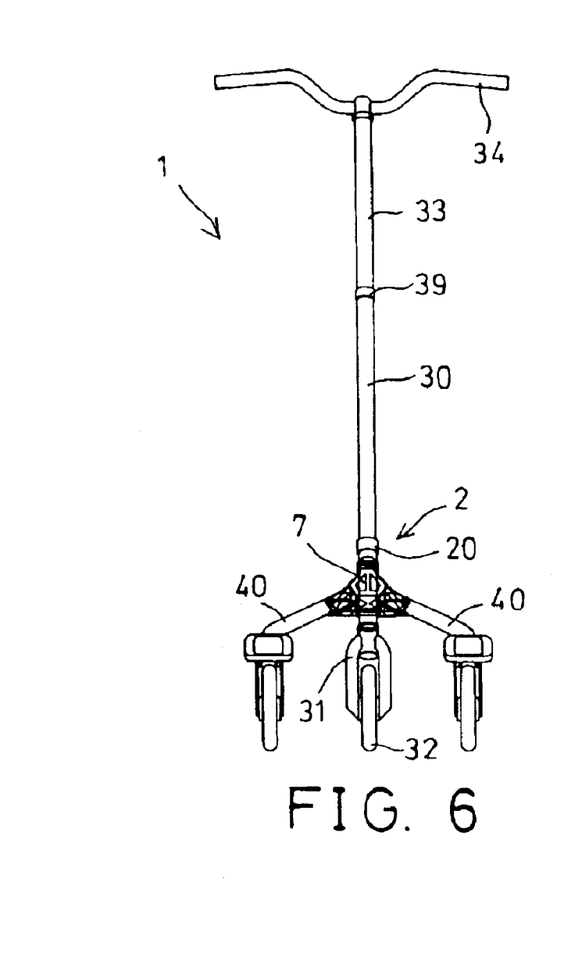
FIG. 6 is a front view of the cambering vehicle of FIG. 1.

As shown in FIG. 3, the front column 2 may include an extension 21 attached to or extended from the front tube 20, such as attached to the upper portion 22 of the front tube 20. The extension 21 comprises an aperture 21a for receiving a spring-biased latch device 23. The spring-biased latch device 23 is attached to the extension 21 of the front tube 20, and includes a latch pin 24 extendible through the aperture 21a of extension 21, downwardly toward the lower portion 25 of the front tube 20.

A bracket 7 is rotatably or pivotally attached to the front tube 20 of the front column 2 with a pivot shaft 71. For example, as shown in FIGS. 7–8 and 10–11, the bracket 7 includes a lower portion 70 rotatably or pivotally attached to the lower portion 25 of the front tube with the pivot shaft 71, to allow the bracket 7 to be rotated relative to the front tube 20 about pivot shaft 71.

Figure 8:
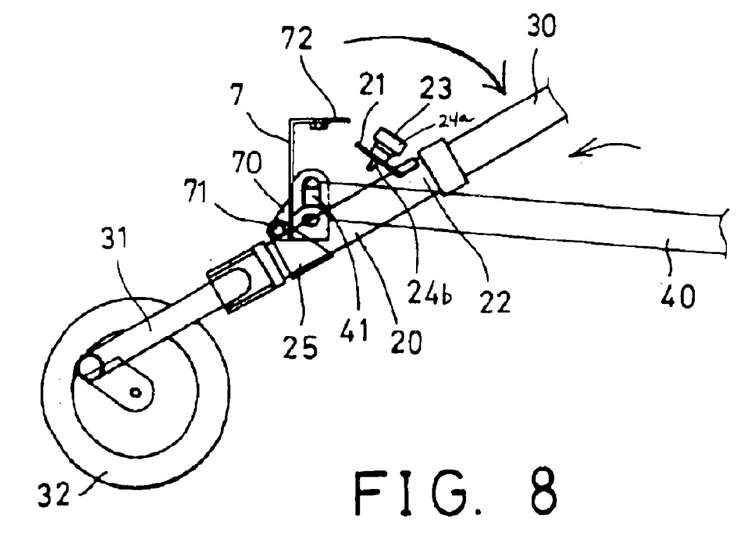
Figure 11:
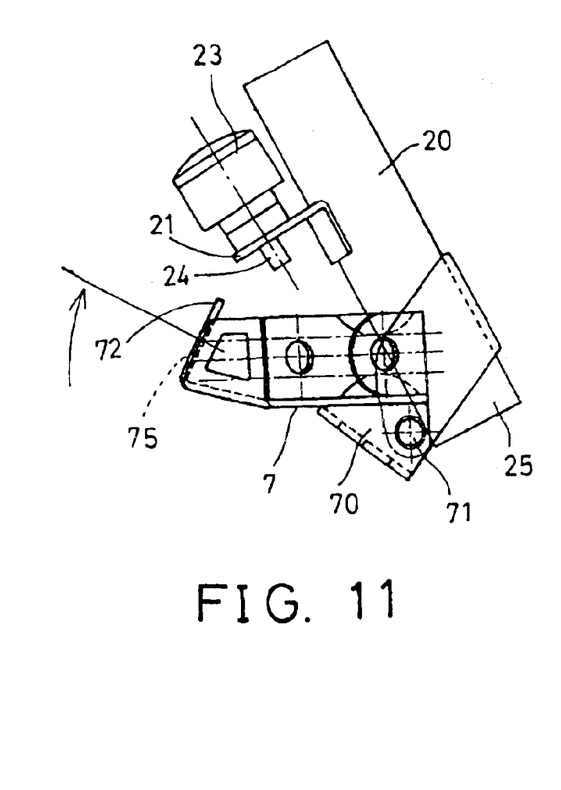

The bracket 7 includes an upper panel 72 having an orifice 73 formed therein in registration with aperture 21a of extension 21 for receiving the latch pin 24 of the latch device 23 which may detachably or openly secure the upper panel 72 of the bracket 7 to the front tube 20. For example, the bracket 7 may be rotated to or away from the front tube 20 when the latch pin 24 of the latch device 23 is disengaged from the upper panel 72 of the bracket 7, as shown in FIGS. 8 and 11.

The latch device 23 comprises a circular cap 24a with a threaded shaft 24b extending therefrom. The orifice 73 of upper panel 72 may be tapped to matingly engage with the threaded shaft 24b, such that twisting of the circular cap 24a in a first direction will engage the threaded shaft within the orifice. Such engagement may be utilized to lock the bracket 7, to place the cambering vehicle 1 in the assembled condition shown in FIGS. 7 and 10. It will be appreciated that twisting of the circular cap 24a in a second direction, opposite that of the first direction, will disengage the threaded shaft 24b from the orifice 73 to unlock the bracket 7, such that the cambering vehicle 1 may be placed in the folded condition shown in FIGS. 8 and 11.

Alternatively, the latch device 23 may be provided with an internal spring (not shown) mounted between the circular cap 24a and the threaded shaft 246, such that the threaded shaft 24b is centered concentric with the spring. The spring may serve the purpose of causing the latch pin 24 to be released from the aperture 21a and orifice 73 upon upward force exerted on the circular cap 24a, but be retained therein absent an external force. Preferably, the threaded shaft 24b will remain within the aperture 21a at all times during this alternate operation, even when the latch pin 24 is pulled from within the aperture 21a and orifice 73. Of course, the spring rate should be sufficiently low to permit a user to easily compress the spring to withdraw the latch pin 24 from the aperture 21a and orifice 73, but sufficiently high to retain the latch device 23 in a secure manner.

Figure 7:
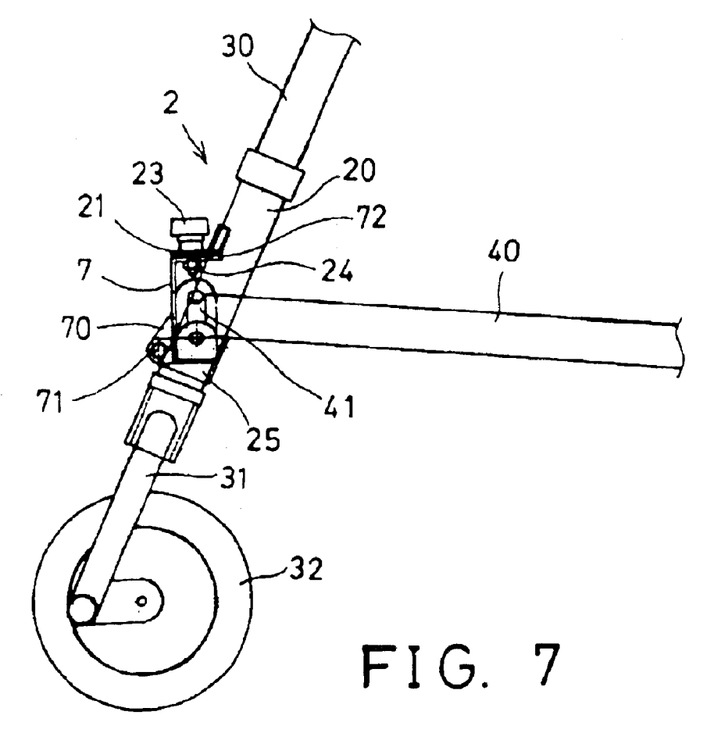
FIGS. 7 and 8 are enlarged partial side views illustrating the folding operation of the cambering vehicle of FIG. 1.
Figure 10:
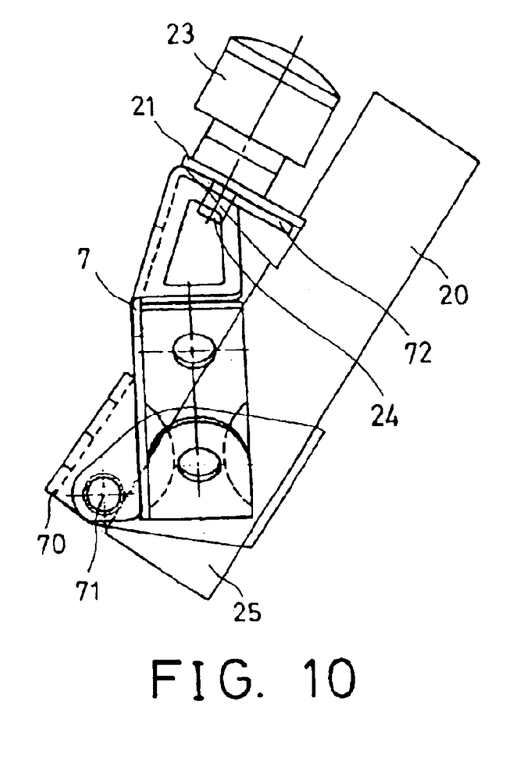
FIGS. 10 and 11 are enlarged partial side views similar to FIGS. 7 and 8 respectively, illustrating the folding operation of the cambering vehicle of FIG. 1.

As shown in FIGS. 7 and 10 when the latch pin 24 of the latch device 23 is engaged into the orifice 73 of the upper panel 72 of the bracket 7, the bracket 7 may be solidly secured to the front tube 20 with the spring-biased latch device 23. The spring-biased latch device 23 may thus be used as a latching means or device to detachably secure the bracket 7 to the front tube 20.

The bracket 7 includes two socket openings 74 formed therein and defined by two frames 75 respectively. Each socket opening 74 has a longitudinal axis or pivotal axis 76 inclined relative to the longitudinal axis 77 of the bracket 7 (FIG. 9) that is generally parallel to the front tube 20, such that the socket openings 74 and/or the frames 75 may also be arranged and inclined relative to the front tube 20 when the bracket 7 is secured to the front tube 20 (FIGS. 1, 4, 6, 7).

Figure 9:
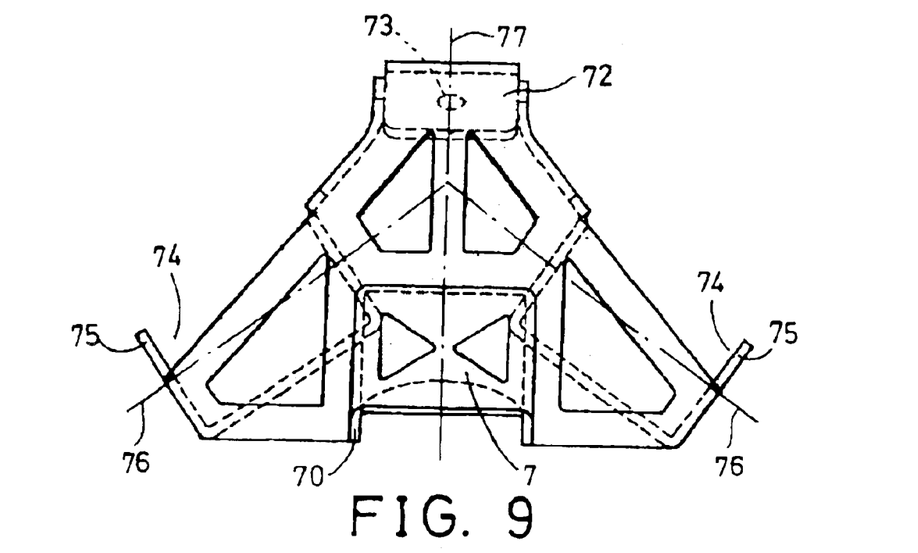
FIG. 9 is a front view of a bracket which forms a part of the cambering vehicle of FIG. 1.
Figure 12:
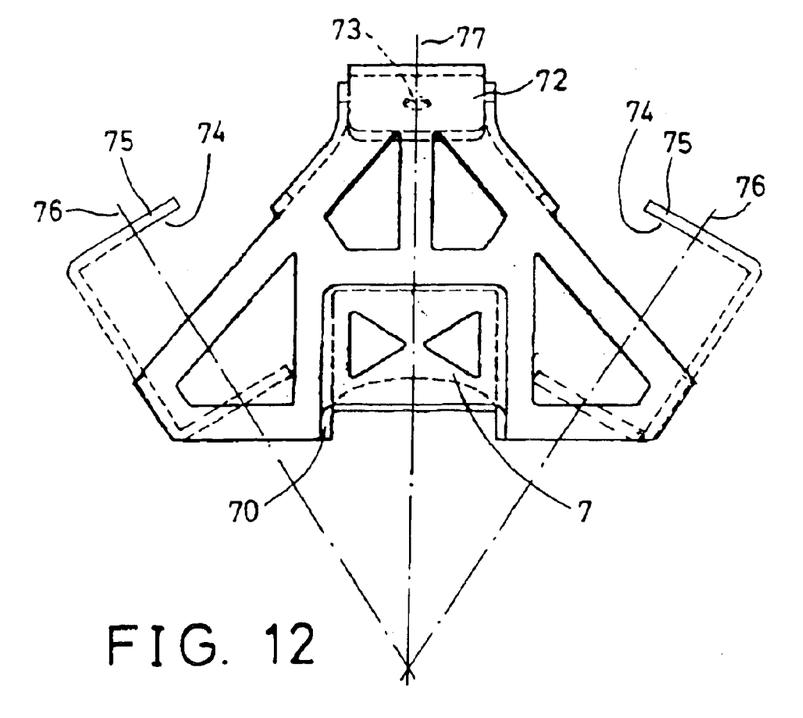
FIG. 12 is a front view of the bracket forming a part of the cambering vehicle of the present invention, similar to FIG. 9, illustrating a second embodiment of the cambering vehicle.

As shown in FIG. 9, the pivotal axes 76 of the socket openings 74 and/or the frames 75 are illustrated to be extended inclinedly and downwardly relative to the bracket 7. However, the pivotal axes 76 of the socket openings 74 and/or the frames 75 may also be arranged in different inclination relative to the bracket 7. For example, as shown in FIG. 12, the pivotal axes 76 of the socket openings 74 and/or the frames 75 may also be arranged to be extended inclinedly and upwardly relative to the bracket 7.

A left trailing arm and a right trailing arm 40 each include a front portion rotatably or pivotally attached to the bracket 7 with pivot axles 78 respectively. For example, each of the trailing arms 40 includes a bushing 41 attached or provided on the front portion thereof, and rotatably attached onto the pivot axles 78 that are secured to the frames 75 of the bracket respectively, for rotatably or pivotally coupling the trailing arms 40 to the front tube 20 with the bracket 7.

The front portions or the bushings 41 of the trailing arms 40 may be rotatably attached to the pivot axles 78 respectively with washers, gaskets, bearings 43 or the like, for allowing the front portions or the bushings 41 of the trailing arms 40 to be rotatably coupled to the front tube 20. Each of the trailing arms 40 includes a downwardly dependent rear wheel 45 rotatably attached to its rear end. Each trailing arm 40 also includes a foot pedal 46 disposed thereon, to support users.

The front portions or the bushings 41 of the trailing arms 40 merge the pivotal axes 76 of the socket openings 74 and/or the frames 75 respectively, such that the front portions or the bushings 41 of the trailing arms 40 also arranged to be inclined relative to the longitudinal axis 77 of the bracket 7 that is parallel to the front tube 20.

The cambering vehicle 1 may further include two brake devices 47 attached to the rear portions of the trailing arms 40 respectively, for braking the rear wheels 45 respectively. The brake hand grips 35 are coupled to the brake devices 47 with the cables 36 respectively, in order to actuate the brake devices 47 to brake the rear wheels 45. Upon actuation of the brake hand grips 35, the brake device 47 is rotated by a cable 36 such that the brake device contacts the rear wheel 45 causing friction therebetween. It will be appreciated that the components may be sized such that sufficient friction will build up to safely and quickly stop the vehicle 1 from the brake speed for which it is designed.

Each of the trailing arms 40 may include one or more ears 48 secured thereto or extended therefrom. The ears 48 of the trailing arms 40 typically face toward each other. A cable or a link 50 includes two ends 51 pivotally or rotatably secured to the ears 48 of the trailing arms 40 with gaskets, bearings, rubber bushings 53 or the like. One end 51 of the link 50 may be rotatably attached to the ears 48 of one of the trailing arms with a pivot pin 49, and the other end 51 of the link 50 may be rotatably and detachably coupled to the ears 48 of the other trailing arm 40 with a fastener, a latch pin 55 or the like, for quick removal. The fastener 55 may be covered by a shield (not shown) to prevent accidental removal of the fastener. The shield may be rotatably or slidably engaged to the link 50, such that it may easily be removed to permit a user to remove the fastener 55 from the link. A chain, string or similar device may be utilized to secure the fastener 55 to the shield, or other component of the vehicle 1, so it will not be lost upon removal.

In operation, the operator alternates the shifting of his or her weight to the inside of each turning arc, to shift the center of mass to the inside of each arc. This shifting causes the front column 2 to be tilted relative to the ground, to result a series of accelerations pushing the vehicle forward in a sinusoidal path to attain a forward motion.

The inclination of the pivot axles 78 relative to the bracket 7 or the front tube 20 respectively may cause or generate a different moving stroke of the vehicle as compared with the moving strokes of the conventional cambering vehicles, which typically include a pair of trailing arms having front ends rotatably secured to the front column with an attachment fitting or shaft that is perpendicular to the front column.

The inclination of the pivot axles 78 relative to the front tube 20 of the front column 2 respectively may also be changed or selected to cause different moving stroke of the vehicle, and thus to change the accelerations of the vehicle. It is preferable, but not necessary, that the pivot axles 78 are arranged symmetric relative to the front column 2 or relative to the bracket 7.

As shown in FIG. 8, when the latch pin 24 of the spring biased latch device 23 is disengaged from the upper panel 72 of the bracket 7, the bracket 7 and thus the trailing arms 40 may be rotated relative to or toward the front tube 20 or the front column 2 to a compact folding or storing position.

As shown in FIG. 7, when the latch pin 24 of the spring-biased latch device 23 is engaged into the orifice 73 of the upper panel 72 of the bracket 7, the trailing arms 40 may be solidly secured to the front tube 20 at a working position or assembled condition, and to retain the vehicle in a tricycle-shaped cambering vehicle.

It is to be noted that, due to the inclination of the pivot axles 78 relative to the bracket 7 or the front tube 20, the trailing arms 40 may be rotated or spaced away from each other when the link 50 is disengaged from the trailing arms 40 to place the vehicle 1 in the folded or storing position. The foldable structure of the trailing arms 40 toward or relative to the front column 2 allows the cambering vehicle to be folded to a compact folding or storing position.

Accordingly, the cambering vehicle includes a left and a right trailing arm rotatably or pivotally attached to a front column with inclined axles, to allow the trailing arms and the rear wheels to be moved without being moved upwardly away from the ground, and to change the moving stroke of the vehicle. The trailing arms may also be folded relative to the front column between folding or storing positions and working positions.

Referring to FIGS. 13–17, a cambering vehicle 101 in accordance with the third embodiment of the present invention comprises a front column 102 including a front tube 120, a steering shaft 130 rotatably engaged or disposed concentrically within the front tube 120, a front fork 131 attached to bottom of the steering shaft 130 to support a front wheel 132, and a handle 134 supported on top of the steering shaft 130.

Figure 13:
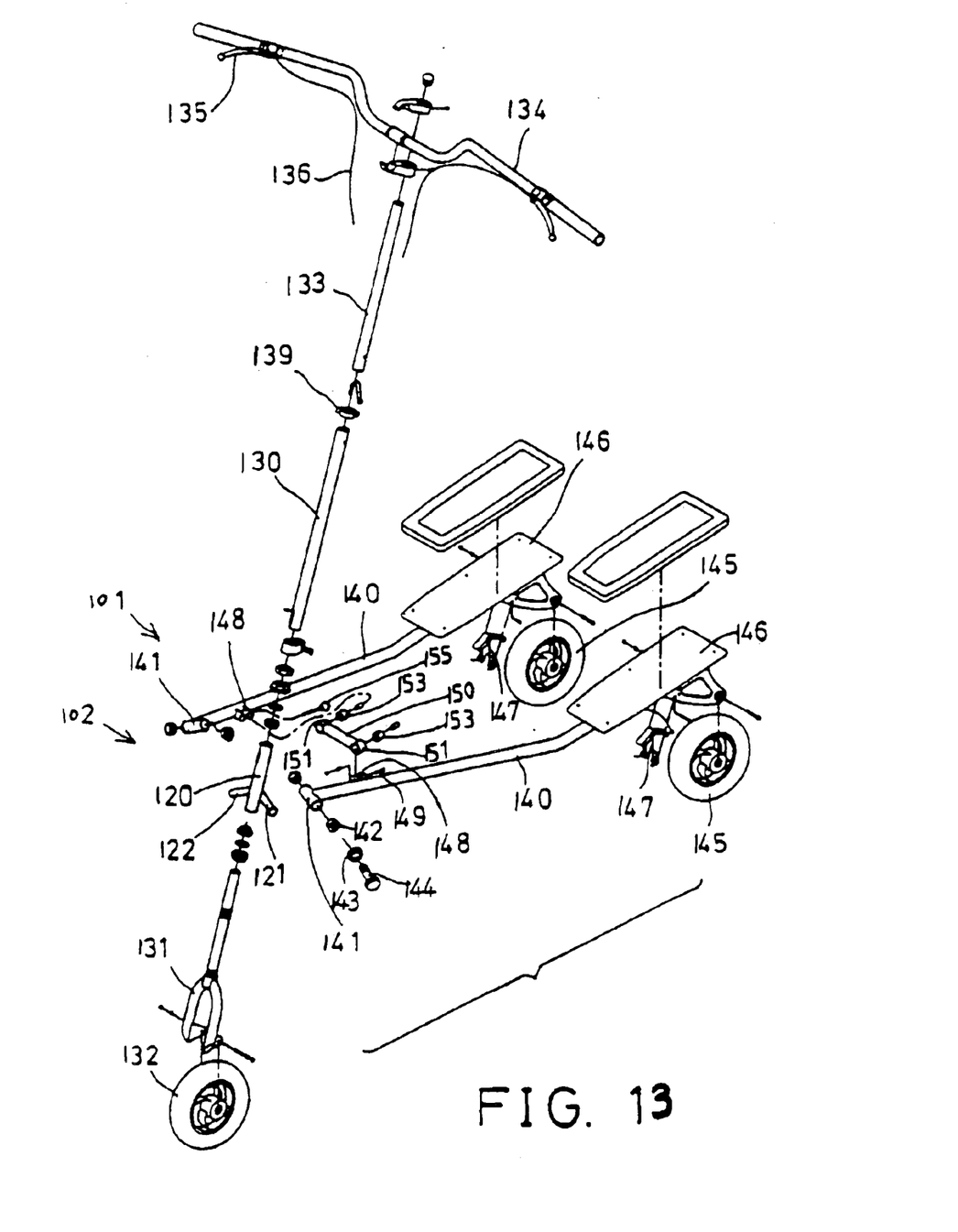
FIG. 13 is an exploded view of a cambering vehicle in accordance with a third embodiment of the present invention.
Figure 14:
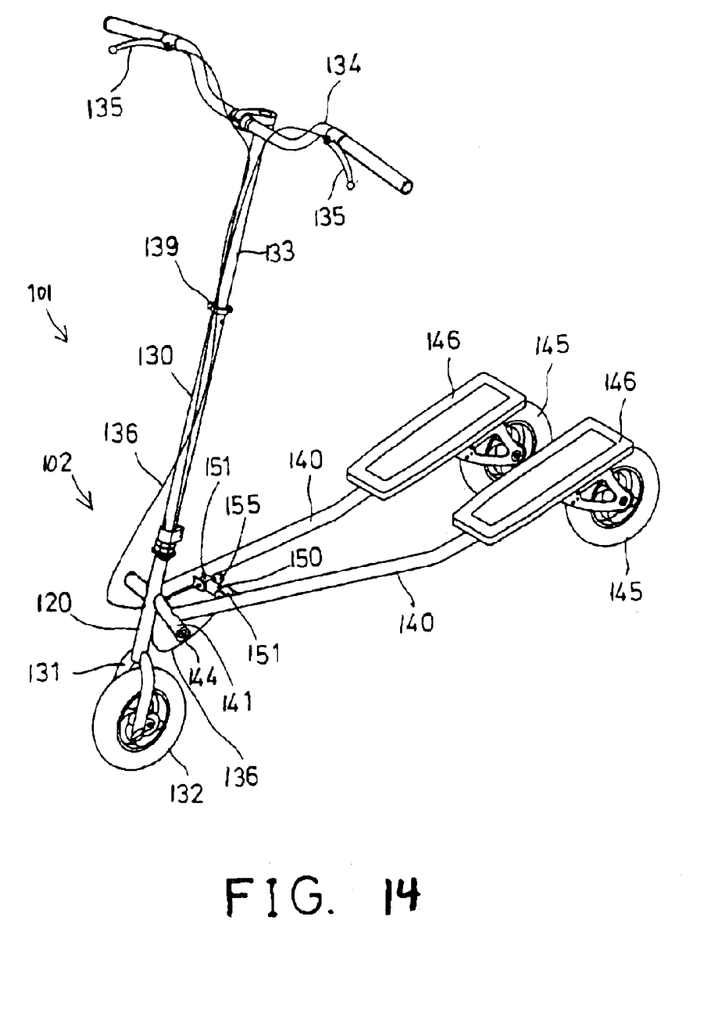
FIG. 14 is a perspective view of the cambering vehicle of FIG. 13.
Figure 15:
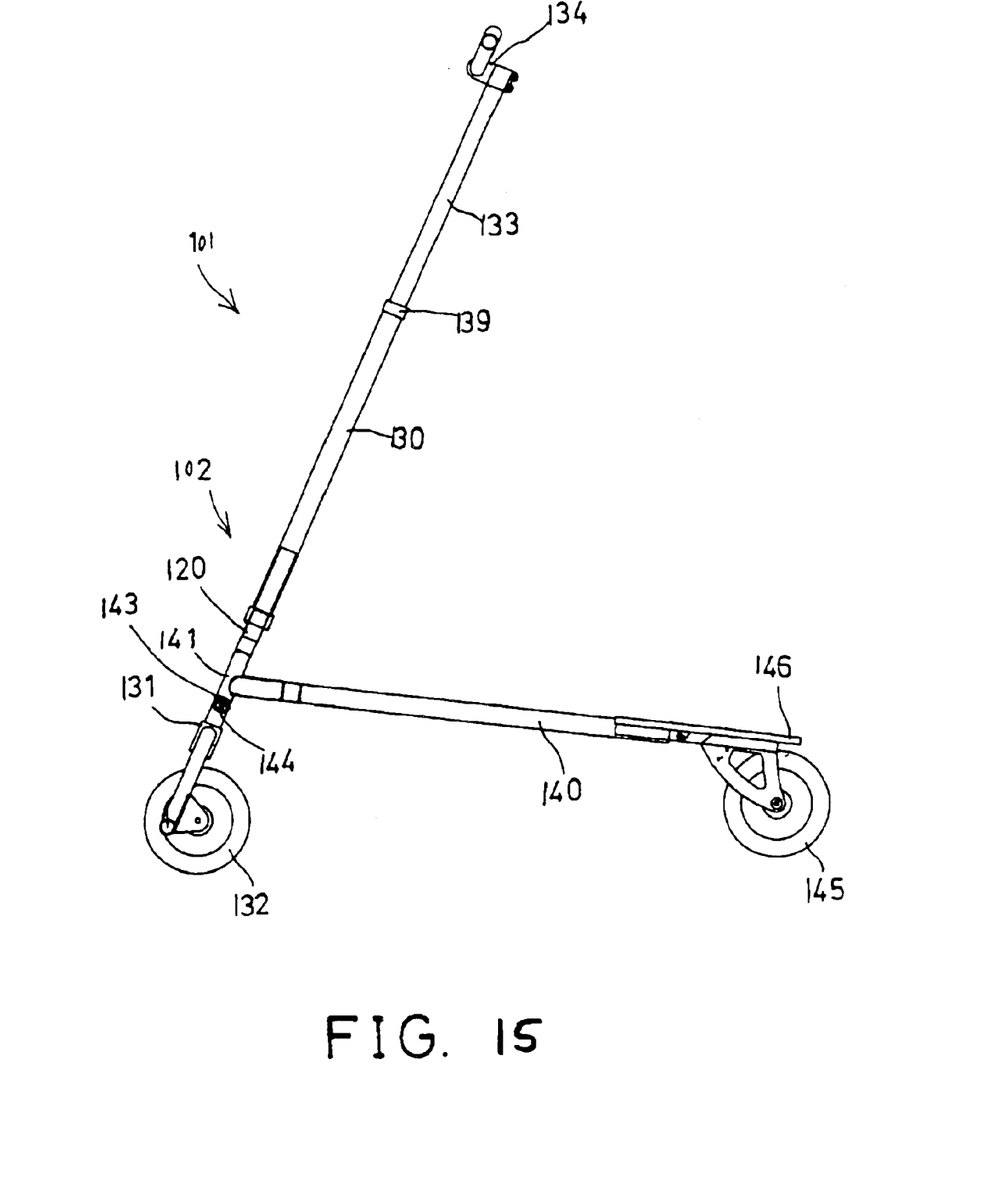
FIG. 15 is a side view of the cambering vehicle of FIG. 13.
Figure 16:
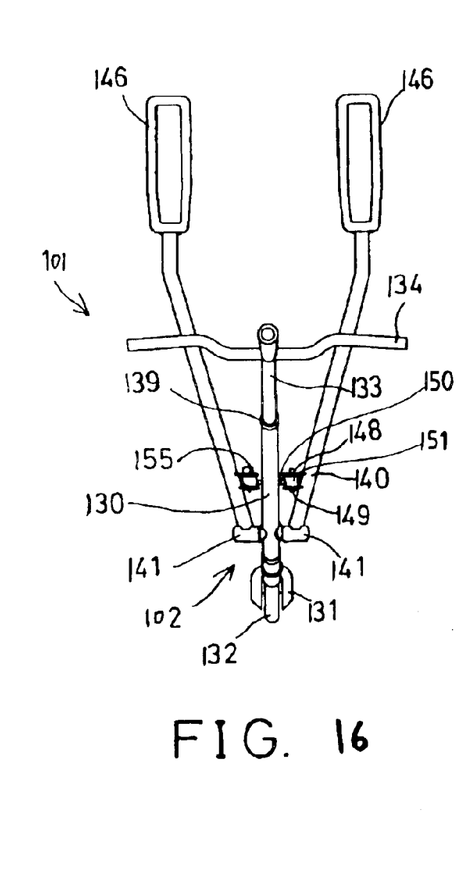
FIG. 16 is a top view of the cambering vehicle of FIG. 13.
Figure 17:
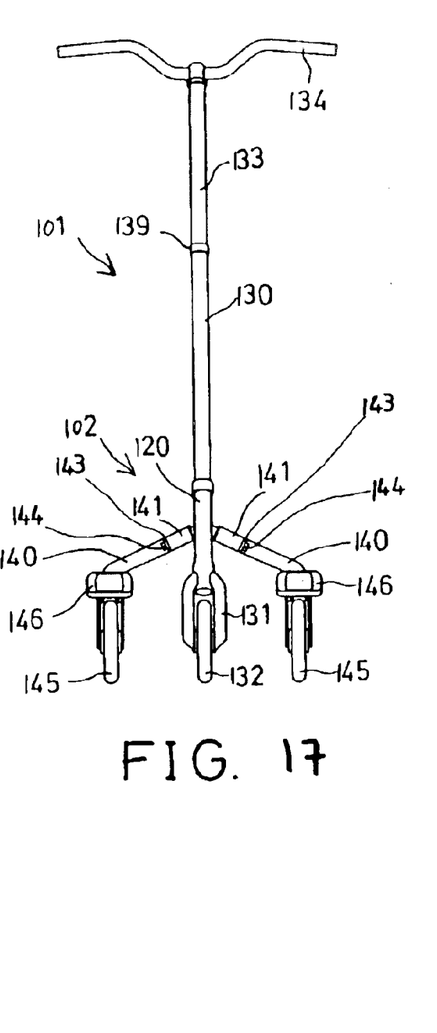
FIG. 17 is a front view of the cambering vehicle of FIG. 13.

The steering shaft 130 may further include a stem 133 retractably received therein and extendible outwardly therefrom, or adjustably secured to the steering shaft 130 with various mechanisms, such as a quick release clamp 139. The handle 134 is secured on top of the steering shaft 130 or on top of the stem 133 of the steering shaft 130. One or more, for example two, brake hand grips 135 may be attached to the handle 134 for braking purposes, and are coupled to cables 136 respectively. As will be discussed, the cables 136 are routed to braking element 147, respectively.

Figures 18, 19:
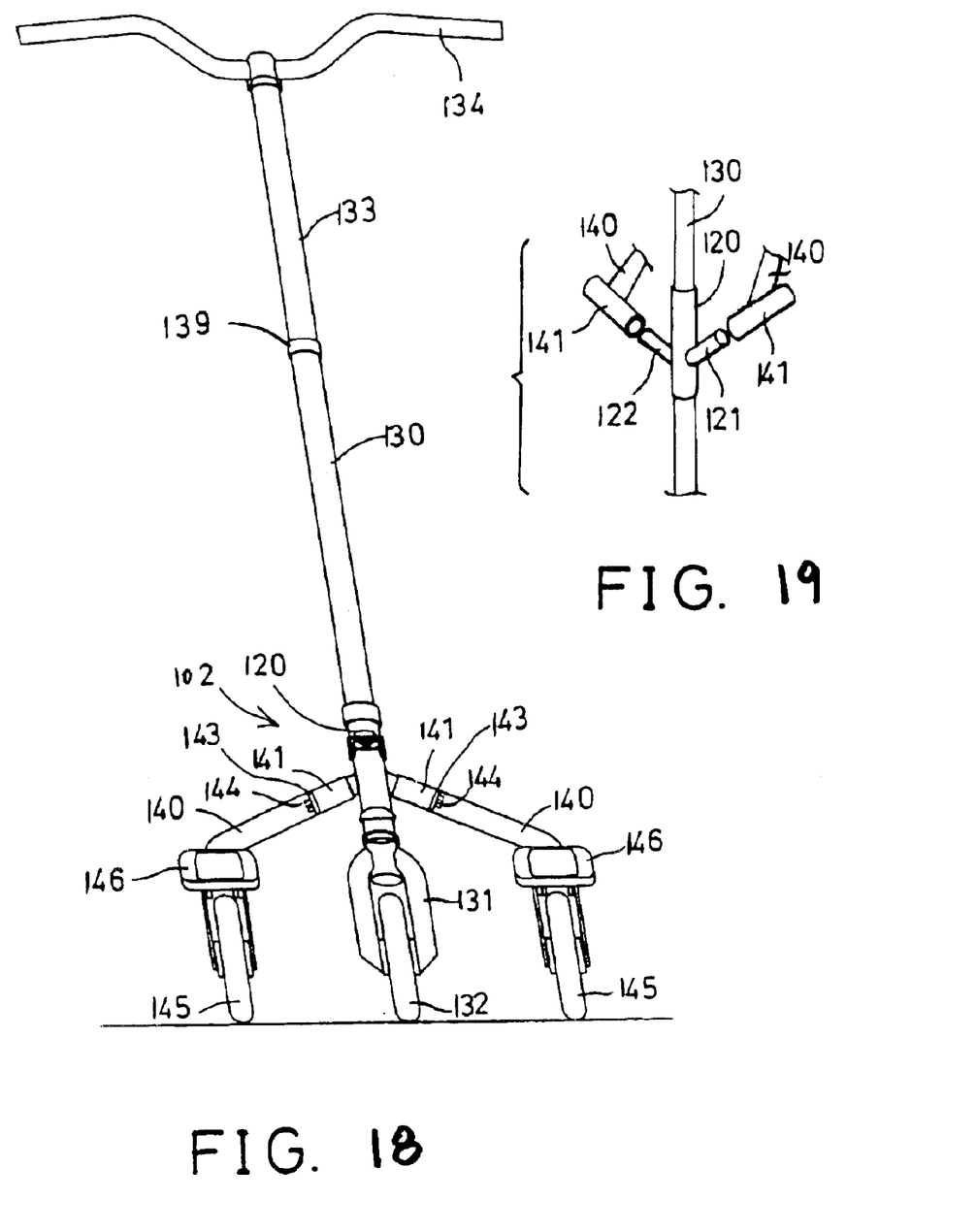
FIG. 18 is a schematic view illustrating the operation of the cambering vehicle in accordance with the present invention.
FIG. 19 is a partial exploded view illustrating a fourth embodiment of the cambering vehicle of the present invention.

The front column 102 includes two pivot axles 121 and 122 extended from the front tube 120, and inclined from the horizontal relative to the front tube 120. For example, as shown in FIG. 1, the pivot axles 121 and 122 and illustrated to be extended inclinedly downward relative to the front tube 120. However, alternatively, as shown in FIG. 19, the pivot axles 121 and 122 may also be extended inclinedly upward relative to the front tube 120.

A left trailing arm and a right trailing arm 140 each include a front portion rotatably or pivotally attached to the front tube 120 of the front column 102 with the pivot axles 121 and 122 respectively. For example, each of the trailing arms 140 includes a bushing 141 attached or provided on the front portion thereof, and rotatably attached onto the pivot axles 121 and 122 respectively, for rotatably or pivotally coupling the trailing arms 140 to the front tube 120 of the front column 102.

The front portions or the bushings 141 of the trailing arms 140 may be rotatably attached to the pivot axles 121 and 122 respectively with bearings 142, washers 143, gaskets or the like, and secured to the pivot axles 121 and 122 with fasteners 144 respectively, in order to solidly or stably couple the trailing arms 140 to the front tube 120 of the front column 102. Each of the trailing arms 140 includes a rear wheel 145 rotatably attached to the rear end, a foot pedal 146 disposed thereon to support users.

The cambering vehicle 101 may further include two brake devices 147 attached to the rear portions of the trailing arms 140 respectively, for braking the rear wheels 145 respectively. The brake hand grips 135 are coupled to the brake devices 147 with the cables 136 respectively in order to actuate the brake devices 147 to brake the rear wheels 145.

It is to be noted that the pivot axles 121 and 122 are illustrated or shown to be secured to or extended from the front tube 120 of the front column 102 respectively. However, the pivot axles 121 and 122 may also be provided on the front portions of the trailing arms 140, and rotatably or pivotally attached to the front tube 120 of the front column 102 respectively with such as bushings (not shown) or the like that may be secured or extended inclinedly from the front tube 120 of the front column 102.

Each of the trailing arms 140 may include one or more ears 148 secured thereto or extended therefrom, where the ears 148 of the trailing arms 140 are facing toward each other. A cable or a link 150 includes two ends 151 to be pivotally or rotatably secured to the ears 148 of the trailing arms 140 with gaskets or bearings 153 or the like. One end 151 of the link 150 may be rotatably attached to the ears 148 of one of the trailing arms 140 with a pivot pin 149, and the other end 151 of the link 150 may be rotatably and detachably coupled to the ears 148 of the other trailing arm 140 with a fastener (not shown), a latch pin 155 or the like.

In operation, the cambering vehicle 101 operates in virtually the same manner as the cambering vehicle 1, previously described. However, in order to fold the cambering vehicle 101, one merely needs to disconnect the fastener, such as latch pin 155, connecting the ear 148 to the trailing arm 140.

Although this invention has been described with a certain degree of particularity, it is to be understood that the present disclosure has been made by way of example only and that numerous changes in the detailed construction and the combination and arrangement of parts may be resorted to without departing from the spirit of the invention as hereinafter claimed.

What is claimed is:

1. A cambering vehicle comprising:
   an elongate front column having a longitudinal axis;
   a bracket assembly attached to said front column by a pivot shaft;
   a first pivot axle and a second pivot axle adjacent said bracket;
   a first trailing arm pivotally attached to said first pivot axle;
   a second trailing arm pivotally attached to said second pivot axle; and,
   first and second rear wheels associated with said first and second trailing arms;
   wherein said steering column may be rotated away from said bracket about said pivot shaft and toward said first and second trailing arms to place said cambering vehicle in a folded position.

2. The cambering vehicle of claim 1, wherein said steering column may be rotated about said pivot shaft toward said bracket to place said cambering vehicle in a working position.

3. The cambering vehicle of claim 2, further comprising a latching mechanism attached to said bracket to secure said bracket to said column in said working position.

4. The cambering vehicle of claim 3, wherein said latching mechanism comprises a spring loaded latch.

5. The cambering vehicle of claim 3, wherein said bracket further comprises an aperture therethrough, said latching mechanism further comprising a spring-loaded shaft capable of fitting within said aperture to releaseably connect said bracket to said steering column.

6. The cambering vehicle of claim 1, wherein said first and said second pivot axles are inclined from an imaginary line perpendicular to said longitudinal axis of said front column.

* * * * *